United States Patent [19]

Nicholas

[11] Patent Number: 5,022,074
[45] Date of Patent: Jun. 4, 1991

[54] DIGITAL ECHO SUPPRESSOR

[75] Inventor: David C. Nicholas, Cedar Rapids, Iowa

[73] Assignee: Rockwell International Corporation, El Segundo, Calif.

[21] Appl. No.: 750,825

[22] Filed: Jul. 1, 1985

[51] Int. Cl.⁵ .............................................. H04M 1/00
[52] U.S. Cl. .................................... 379/407; 379/406; 370/32.1
[58] Field of Search ............... 179/170.2, 170.6, 170.8, 179/81 B; 370/32, 32.1; 379/406, 409, 407, 410, 399, 408

[56] References Cited

U.S. PATENT DOCUMENTS

| | | | |
|---|---|---|---|
| 3,562,448 | 2/1971 | May, Jr. | 179/170.6 |
| 3,699,273 | 10/1972 | Montgomery | 179/170.2 |
| 3,821,494 | 6/1974 | Besseyre | 179/170.6 |
| 3,896,273 | 7/1975 | Fariello | 179/170.6 |
| 4,123,626 | 10/1978 | Munter | 179/170.2 |
| 4,560,840 | 12/1985 | Hansen | 179/81 B |

Primary Examiner—Jin F. Ng
Assistant Examiner—Jhancy Augustus
Attorney, Agent, or Firm—C. B. Patti; V. L. Sewell; H. F. Hamann

[57] ABSTRACT

A digital echo suppression circuit in a four-wire digital telephony circuit having an echo from a local or remote connection to a two-wire circuit or other echo source. The invention incorporates a simple method of using the sample pairs from the first and second sampling circuit to produce a control signal from a control circuit. If the subscriber signal is "louder" than the network signal, then the subscriber signal is passed through. If the network signal is louder than the subscriber signal, the interrupter is activated and a zero level is substituted for the subscriber signal in transmissions toward the network. The invention uses the scheme of comparing instantaneous signal amplitude and using the larger amplitude to set a threshold value. The signal setting the threshold then remains the "loudest" until such time as the other signal can exceed the threshold. The threshold is slowly decremented, but the original signal may refresh the threshold to a higher level if a new peak value replaces the old threshold value with the new peak value. The identity of the input network or subscriber producing the threshold is stored. If the current threshold is the result of a network signal, the interrupter is activated and echo is suppressed. If the current threshold is the result of a network signal, the interrupter is activated and echo is suppressed. If the current threshold is the result of a subscriber signal sample, then the interrupter is deactivated and subscriber signals are transmitted onward toward the network.

4 Claims, 2 Drawing Sheets

DIGITAL ECHO SUPPRESSOR

BACKGROUND OF THE INVENTION

This invention relates in general to telephone communication circuitry and, in particular, to suppressing echo returned from one end of a four-wire transmission path due to the reflection of signals originating at the other end. The source of such echo is often an impedance mismatch at the hybrid circuit, which provides conversion from four-wire to two-wire transmission, at the end of the four-wire section.

Echo suppressors and their more sophisticated improvements, echo cancellers, are, of course, well known and widely used in long distance transmission. Existing echo suppressors make their decisions on the basis of the short-term average power level of two signals. This type of suppressor is relatively expensive and difficult to implement, particularly in digital form. The invention here uses peak signal level and a simple threshold memory, rather than average power, which yields much simpler, less-expensive implementation.

Echo suppression is normally necessary only on circuits having a long delay. In the past long delay could be equated to long distance. On relatively expensive long distance circuits the expense of a high-cost echo suppressor or echo canceller could be tolerated. With the advent of digital local transmission, and even voice transmission on local area networks originally designed for data, long delays requiring echo treatment can be generated even on low-cost local circuits where economical echo suppression is more important. A particular problem exists for telephone communication on a local area network which uses token passing or carrier sense multiple access techniques, and which therefore provides relatively long, sometimes variable delay times between burst transmissions. Virtual voice circuits derived by means of local area networks require both speed changing buffers and additional buffering to smooth out variable delays. In order to keep overhead requirements reasonable, packets, which are relatively long in voice terms, are used. For reasonable size buffers absolute delays of several tens of milliseconds will occur even on local connections.

Local area networks are themselves typically four-wire, and echo might not occur; however, a practical local area network for voice must interface two-wire telephone circuits. Echo will occur at the two-wire to four-wire connection point. Therefore, echo control must be incorporated since the subjective effect of echo is increased by delay anywhere in the echo path and the buffer used in such networks produce delays sufficiently long to be troublesome.

The present invention provides a novel digital circuit for echo suppression which is particularly simple to implement in digital form compared with previous techniques. One embodiment of the present invention is a "half echo suppressor" or "split echo suppressor," which suppresses echo from one direction only. In the local area network application mentioned above, echo occurs only in one direction. In fact, in most applications, even if full, both-ended echo suppression is required, it is accomplished with two such devices, one at each end of the circuit, rather than a single device in the middle. An extension to a full echo suppressor is another embodiment of the present invention. Related to this embodiment the term "four-wire transmission" is, of course, used in the generic sense to denote a circuit having a separate path for each of the two directions of conversation whether derived on four conductors, three conductors, or by time or frequency division multiplexing or by other means, and whether or not he representation is analog or digital.

SUMMARY OF THE INVENTION

The invention involves a digital echo suppression circuit for use in a four-wire digital telephony circuit in which exists an echo from a local or remote connection to a two-wire circuit or other echo source. The echo suppressor thus has two four-wire ports. Since the source of echo is often ultimately a two-wire subscriber line, the four-wire port on which returning echo is to be suppressed would normally be connected to the subscriber and is referred to as the subscriber port. The other four-wire port is referred to as the network port. Signals arriving at the network port are passed through to the subscriber port unaltered, but they are sampled for comparison purposes. In the implementation discussed here these samples are obtained by a first sampling means. Signals arriving from the subscriber are similarly sampled by a second sampling means. Unlike the first signals, these signals may or may not be passed unaltered depending on whether or not they are determined to contain echo or not. Thus, after passing through or past the second sampling means, the signals from the subscriber pass through an interrupter circuit prior to onward transmission toward the network. If echo is present and to be suppressed, the interrupter circuit substitutes the appropriate digital representation for a zero signal level. The interrupter is in turn controlled by a control signal from a control circuit. The control circuit uses as its input signal samples from the first and second sampling means.

The present invention incorporates a simple method of using the sample pairs from the first and second sampling means to produce the control signal from the control circuit.

More particularly, if the subscriber signal is "louder" than the network signal, then the subscriber signal is passed through. If the network signal is louder than the subscriber signal, the interrupter is activated and a zero level is substituted for the subscriber signal in transmissions toward the network.

Conventional echo suppressors determine "loudness" by computing average power over some interval. That requires the averaging of many samples. This invention uses the much simpler scheme of comparing instantaneous signal amplitude and using the larger amplitude to set a threshold value. The signal setting the threshold then remains the "loudest" until such time as the other signal can exceed the threshold. The threshold is slowly decremented, but the original signal may refresh the threshold to a higher level if a new peak value replaces the old threshold value with the new peak value. The identity of the input network or subscriber producing the threshold is stored.

If the current threshold is the result of a network signal, the interrupter is activated and echo is suppressed. If the current threshold is the result of a subscriber signal sample, then the interrupter is deactivated and subscriber signals are transmitted onward toward the network.

The threshold is slowly decreased over time so that the other party may speak when the correct party finishes.

OBJECTS OF THE INVENTION

It is a general object of the present invention to provide an improved digital echo suppression circuit.

It is another object of the present invention to provide an echo suppression circuit which has less components than prior art systems and is cost effective to manufacture.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawings, in the several figures of which like reference numerals identify like elements, and in which:

FIG. 3 is a diagram of digital control signals used in the FIG. 2 circuit.

DESCRIPTION OF THE PREFERRED EMBODIMENT

Figure 1:
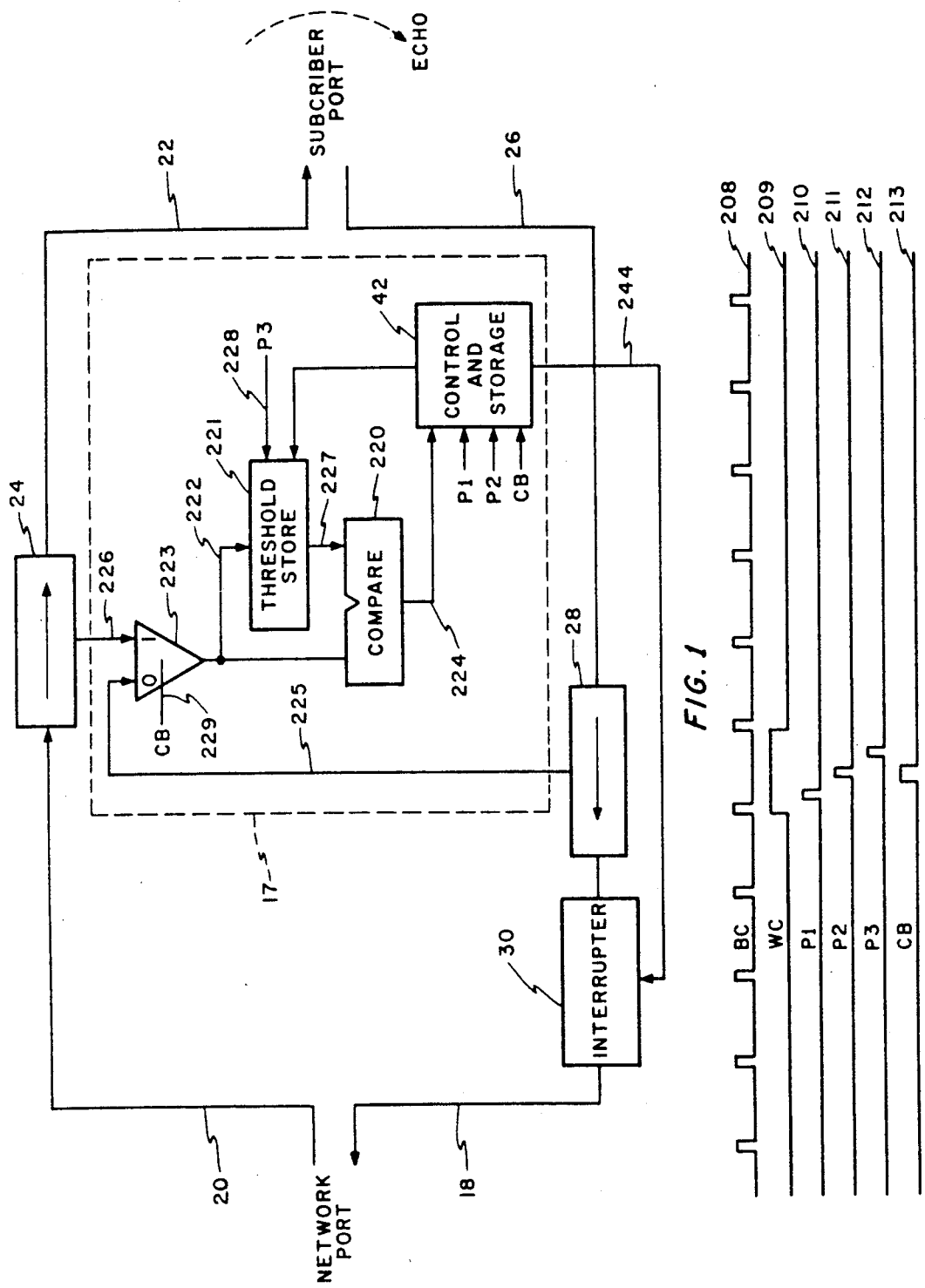
FIG. 1 is a general block diagram of the present invention.

The present invention provides a novel digital echo suppression circuit for use with a telephone communication network. In general terms and referring to FIG. 1, which depicts a generic digital half-echo suppressor, the echo suppressor has a four-wire subscriber port consisting of input 26 and output 22. The echo suppressor has a four-wire network port consisting of input 20 and output 18. An undesirable echo signal may be returned from the subscriber on input 26 when signals are passed through from the network toward the subscriber on output 22.

A first sampling means 24 is interposed between network input 20 and subscriber output 22. Samples from the first sampling means 24 of the signal are sent to a decision circuit 17 while permitting signals to flow from input 20 to output 22. A second sampling means 28 is interposed between subscriber input 26 and an interrupter 30, and also sends samples to the decision circuit 17, while permitting signals to flow to interrupter 30. Interrupter means 30 then either permits signals to flow through from the second sampling means onward to network output 18, or interrupts these signals and forwards a zero signal to output 18 depending on a control signal received on line 244 from the decision circuit 17.

As shown in FIG. 1, the network input 20, sampling means 24, and the subscriber output 22 constitute a first communications channel means permitting signals to flow from the network to the subscriber. The subscriber input 26, the second sampling means 28, the interrupter 30, and the network output 18 constitute a second communications channel means permitting signals to flow from the subscriber to the network in some cases, but interrupting them in other cases depending on the action of the interrupter 30.

The interrupter is in turn controlled by the decision circuit 17 consisting of a collection of four elements shown. These include a selector 223 operatively connected to the first and second sampling means for recovery and selecting samples from one or the other sampling means for further processing according to a control input 229. The output of selector 223 provides the selected sample both to the input of a threshold store 221 and also to the input of a comparator circuit 220. The other input of the comparator circuit 220 is the output 227 of the threshold store.

The comparator circuit 220 provides an output 224 connected to the control circuit 42 indicative of which comparator input is larger in magnitude. The control circuit 42 in turn provides outputs to control the interruptor 30, output 244, and to command loading of a threshold register. The control circuit 42 also includes storage means for remembering the identity of the speaker supplying the last threshold value.

The threshold store 221 is also arranged to decrement the magnitude of its contents by one unit in response to a decrement signal 228.

Operation of this circuit requires external timing inputs BC, CB, P1, P2, and P3. BC is utilized by shift register means 24 and 28, and also by interrupter 30. CB is connected to selector control input 229 and to control circuit 42. P1 and P2 are likewise used by the control circuit 42, while P3 serves as the decrement input 228 to the threshold register.

Figure 2:
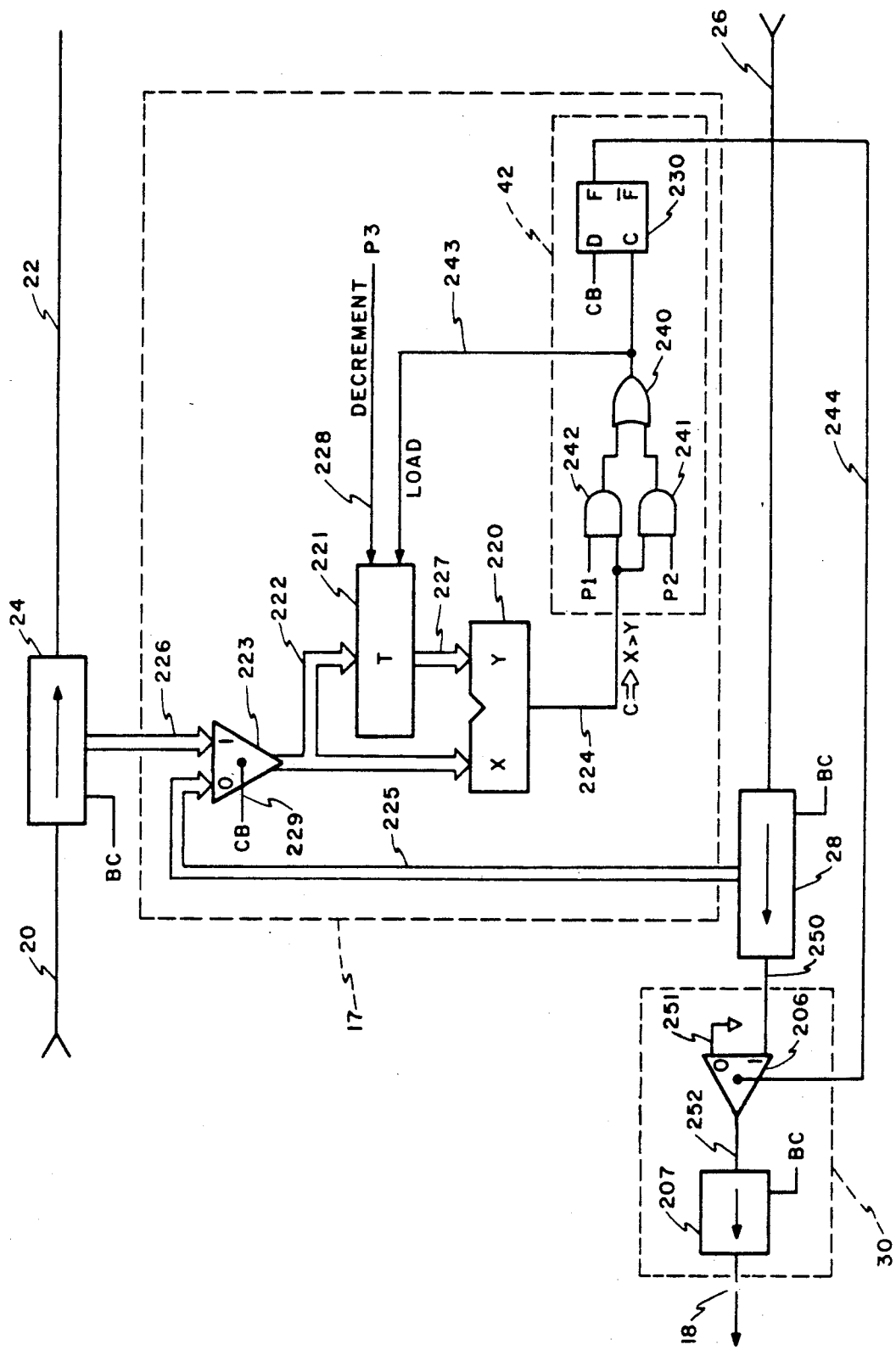
FIG. 2 is a circuit diagram of the FIG. 1 block diagram which shows this invention in detail.

A more detailed version of the implementation is shown in FIG. 2, while FIG. 3 shows the relative timing of the BC, CB, P1 P2, and P3 signals.

FIG. 2 shows an embodiment of FIG. 1 which implements the instant invention. In discussing FIG. 2, specific assumptions are made regarding how the network and speaker signals are represented in order to describe a specific implementation. The implementation would, of course, vary if different signal representations are used.

The following is a more detailed description and refers to FIGS. 2 and 3. Like elements in FIGS. 1 and 2 are similarly labeled. FIG. 2 simply shows more detail than FIG. 1. FIG. 3 shows timing signals used to drive the circuitry of FIG. 2 at the points indicated.

In FIG. 2, the network input signal enters the system in serial digital form on line 20. The signal is in sine magnitude format with the least significant bits transmitted first the most significant bits transmitted later, and with the sign bit transmitted last. The network input signal flows through a shift register 24 in which an entire word of the digital format representing a single voice sample can be contained. Signals flow serially through the shift register 24 out on line 22 which is the subscriber output. A parallel output is also provided from the shift register on bus 226 to parallel selector 223. Shift registers 24 and 28 are, respectively an embodiment of the first and second sampling means of FIG. 1.

Similarly, subscriber input signal 26 in a similar format flows into the echo suppressor circuit through a shift register 28 to a selector 206 and, conditionally, to a one bit shift register 207 and out on a line 18 toward the network. The actual suppression function is performed by 206 and 207 which correspond to interrupter means 30 of FIG. 1. Selector 206 can select and transmit onward, through shift register 207 onto line 18, either the incoming subscriber signal or a zero signal. When echo is to be suppressed, the zero signal is the signal transmitted. In some implementations, shift register 207 may not be needed and output 18 would come directly from selector 206. Here flip-flop 207 serves to force signal transitions onto the bit boundaries delineated by bit clock BC.

In the detailed operation of the circuit, all bits are clocked through shift registers 24, 18 and 207 by the bit clock BC which is shown as waveform 208 in FIG. 3. BC is applied to the clock inputs of 24, 28, and 207 as shown in FIG. 2, as are the other timing signals shown in FIGS. 2 and 3 including P1, P2, P3 and CB. Waveform WC, labeled 209 in FIG. 3, is provided for reference only and is shown to indicate when the voice sample word is correctly aligned in shift registers 24 and 28. During this alignment the pulses P1, P2, P3 and CB occur as shown in FIG. 3. WC itself is not used. In FIGS. 2 and 3, positive logic, in which the most positive level represents a logic one and a low level represents a logic zero, is assumed. In the waveforms of FIG. 3, logic 2 levels are depicted as levels more toward the top of the Figure.

As stated above, the actual echo suppression function is performed by selector 206. In device 206, either the output of shift register 28 on line 250 is selected, or a zero signal is selected. The selector is a device which is capable of selecting one of two inputs and delivering that input to a given output depending on the value of a control signal. The selector is a standard logic device sometimes also referred to as a two-input multiplexer. It has inputs referred to as the one and zero inputs, an output, and a control signal input. Here the control signal is on line 244 from the control circuit 17.

In FIG. 2, the zero input 251 is grounded to provide a zero signal level when selected, since in sign magnitude representation an all-zeros sample corresponds to a zero voice signal level. The one input is line 250; the output is 252. When the control input is a one, then the output equals the value of the one input; when the control input is zero, then the output equals the value of the zero input.

The control circuit 42 consists of devices 240, 241, 242, and 230. The control input 244 originates in flip-flop 230—a standard D-flip-flop. Flip-flop 230 in turn contains the value indicative of whether the network input or subscriber input produced the last signal loaded into the threshold register 221. That is to say, it contains the value indicative of which source of samples produced the current threshold.

The logic in the system is controlled by three phased control signals labeled P1, P2, and P3, and a signal CB all of which occur entirely within the single bit time of each word during which an entire word representing a single voice sample is correctly aligned within shift registers 24 and 28 as shown in FIG. 3. During this time a three-step process occurs corresponding to pulses P1, P2, and P3.

A signal CB switches selector 223 to its one input when high and to its zero input otherwise. Selector 223 differs from selector 206 in that it deals with parellel signals containing all the magnitude bits of registers 24 and 28. Selector 223 may be thought of as a number of 206-type selectors equal to the number of bits in the word and each dealing with corresponding bits on parallel busses.

First, prior to and also during pulse P1, the signal CB is zero and the zero side inputs of 223 are selected. The contents of register 28 are thus presented to the X input of the comparator 220 and also to the input of the threshold register 221.

In the case of threshold register 221, the input is not loaded into the threshold register 221 at that time. Rather, the current contents of threshold register 221 are presented to the Y input of comparator 220 via bus 227, and a comparison is made to determine whether the magnitude of the X input, which is at this instant the magnitude of the current network input sample, is greater than or less than the current threshold on the Y input. The result of this comparison is indicated by signal C on line 224 in FIG. 2.

At clock time P1, in the case where signal C is a logic one indicative of the fact that X input of comparator 220 is greater than the Y input, the AND-OR circuit which is the combination of gates 242 and 240 will generate a load signal on line 243. The 243 load signal is fed to the load input of threshold register 221. Therefore, in this case if the network input sample magnitude is greater than the current threshold, then at the end of clock period P1 the current value of the network input flowing through selector 223 to the inputs of register 221 will be substituted for the old threshold value. If the sample magnitude is less than or equal to the old value then no substitution occurs. Note that the algebraic sign of the sample is not utilized and that comparisons are made on magnitude only.

When the load signal on line 243 occurs, the current value of CB, always zero during the P1 pulse, is loaded into flip-flop 230. Thus, flip-flop 230 is loaded with a zero just in case the new network sample has been loaded in the threshold register.

Next, during clock period P2, a similar process occurs in which the magnitude of the subscriber input signal sample contained in register 28 is compared with the current threshold and substituted just in case it exceeds the value of the current threshold. This is accomplished by feeding the magnitude of the contents of register 28 through bus 225 to the one inputs of selector 223. This selector 223 is shifted to its one-input position causing the subscriber sample on bus 225 to flow through 223 and out on bus 222 to the X input of comparator 220 and a comparison is made between the subscriber sample and the current threshold on bus 227.

The signal on bus 222 also flows to the input of threshold register 221.

In the AND-OR circuit previously mentioned, gates 241 and 240 produce the required load signal for the threshold register 222 just in case the subscriber sample exceeds the value of the current threshold. In that case, subscriber sample magnitude is substituted for the current threshold.

The flip-flop circuit 230, which actually controls the echo suppression process, is also loaded with the value of the signal CB at the time the threshold register is loaded. CB is a logic one during the subscriber sample comparison. Thus, when the current threshold is the result of the signal on the network input, flip-flop 230 is loaded with a zero, the zero input of selector 206 is selected, and echo suppression occurs. On the other hand, when the threshold register is loaded with the result of a large signal from the subscriber input coming out of register 28, flip-flop 230 is loaded with the value of CB when it is a 1, the one input of selector 206 is selected, the subscriber input signal is permitted to flow through the echo suppressor to the network output, and echo suppression does not take place.

The necessity for echo suppression at the subscriber end of the circuit generally corresponds to whom is speaking. If the distant or network end is speaking, echo suppression should take place. If the subscriber is speaking, echo suppression should not take place.

From the operation of this circuit, it is clear that the same speaker can update the threshold with larger and larger values. Since in a conversation the speaker changes periodically, the final step in the echo suppression process is the necessity to periodically decrement the value of the threshold so that a new speaker may "gain the floor" when louder or when the existing speaker stops speaking. This is accomplished by the decrement signal 228 input to the threshold register device 221. Here we utilize a standard register device to implement 221 which also contains within it circuitry required to decrement its contents by one unit whenever the decrement signal is activated. The decrement signal is signal P3 which is waveform 212 of FIG. 3. This signal occurs here periodically every word time. In any case, the frequency of the P3 signal determines the rate a which the contents are decremented.

In general, for most word lengths and prompt echos, the arrangement described above is satisfactory. For long delayed echos the frequency of P3 must be reduced by permitting it to occur, for example, only every other word time.

The devices depicted in FIG. 2 are standard logic devices available from several sources. For example, selecting devices from "The TTL Data Book for Design Engineers", Texas Instruments Corporation, Second Edition 1976, and assuming an 8-bit sample word length, the following correspondences exist:

| Device | TI Type Number | Qty Required |
| --- | --- | --- |
| Register 24 | 74164 | 1 |
| Register 28 | 74164 | 1 |
| Flip-Flops 207 and 230 | 74175 | 1 |
| AND Gates 241 and 242 | 7409 | 1 |
| OR Gate 240 | 7432 | 1 |
| Decrementing Register/Counter 221 | 74191 | 2 |
| Comparator 220 | 7485 | 2 |
| Parallel Selector 223 | 74157 | 2 |
| Selector 206 | 74157 | 1 |

In many cases only part of the device is used. For example, the 74157 device handles 4 signals in parallel from two sources. Only ¼ of the device is required to implement selector 206 while two devices are required for selector 223. In the discussion heretofore we have assumed that echo is present only from the subscriber side, and a "half echo suppressor" has been discussed. Even if echo occurs at the network end of the connection, it is normally desirable to utilize, as mentioned previously, a second half echo suppressor at the distant end rather than a full echo suppressor which suppresses echo in both directions. Nevertheless, a full echo suppressor can easily be built if desired.

Referring to FIG. 2, a second selector similar to 206 and a second buffer flip-flop similar to 207 are inserted in line 22. Then the control input of this new selector is driven with line 244, but the selector inputs are connected such that when 244 is high a zero signal is selected from the one input of the new selector. The signal from register 24 is, of course, connected to the zero input. Thus, when the network to subscriber path is interrupted, the subscriber to network path is connected, and vice versa.

In another modification of the invention, the threshold function is eliminated and sample pairs are compared to each other rather than comparing each sample to a threshold. While the threshold function is very important in obtaining satisfactory operation, an echo suppressor which works only on the pairs without a threshold has some utility. In terms of FIG. 2, if the threshold register 221 is cleared to zero by P3 each word time, then this simpler function is accomplished. In this case, the threshold register might be mechanized with Texas Instruments SN74174 devices and P3 would be used in inverted form and applied to the "Clear" input of the device.

The invention is not limited to the particular details of the apparatus depicted and other modifications and applications are contemplated. Certain other changes may be made in the above described apparatus without departing from the true spirit and scope of the invention herein involved. For example, in the descriptions above in the interest of clarity individual logic elements have been described to perform the functions required in most cases. While the circuits shown are useful in these simple cases, in actual practices the echo suppression function may be combined with other signal processing tasks, may utilize time multiplexed circuitry providing the function for more than one channel at a time, and may utilize special purpose or general purpose programmable logic elements or computers to perform certain functions including using one element to perform the functions of several separate elements shown here. It is intended, therefore, that the subject matter in the above depiction shall be interpreted as illustrative and not in a limiting sense.

What is claimed is:

1. A digital echo suppression circuit for use in a digital four-wire circuit having a network port and a subscriber port, each network and subscriber port having an input and an output, said digital echo suppression circuit comprising:

first means for establishing a communication channel from the network port input to the subscriber port output having at least a first shift register;

second means for establishing a communication channel from the subscriber port input to the network port output having at least a second shift register in series with a means for interrupting said second channel means;

means for selecting a selected signal from either the first or second shift register means;

threshold means for storing only one said selected signal, said threshold means having a load input and a decrement input;

means for comparing said selected signal with contents of said stored threshold means and outputting a resulting signal;

control means for receiving a first control signal, a second control signal and said resulting signal and having a means for generating a load command to said threshold means;

means for storing said selected signal in said stored threshold means based on the result of said comparison;

means for storing an identity of said selected signal stored in said threshold means;

means for transmitting to said interrupter means a control signal corresponding to said stored identity in response to said load command, said means for interrupting operating to interrupt the second channel means depending on the identity stored in said identity storage means; and means for reducing said selected signal stored in said threshold storage means over time, said means for selecting having parallel selectors, having a first input operatively connected to a parallel output of said first shift register, and having a second input operatively connected to a parallel output of said second shift register, and having a control input for receiving a switching control signal and having an output, said control means and said storage means having a first AND gate having a first input for receiving a first digital control signal, having a second input operatively connected to said output of said means for comparing and having an output;

a second AND gate having a second input for receiving a second digital control signal, having a first input operatively connected to said output of said means for comparing and having an output; and an OR gate having a first input operatively connected to said output of said first AND gate, having a second input operatively connected to said output of said second AND gate and having an output operatively connected to said load input of said threshold means.

2. The circuit described in claim 1 wherein said means for storing an identity of said selected signal is a flip-flop circuit.

3. The circuit described in claim 1 wherein said means for interrupting comprises:

serial selector having a data input operatively connected to an output of said shift register of said second channel means, having an output and a control input operatively connected to said output of said means for transmitting.

4. The circuit described in claim 3 wherein said means for interrupting further comprises a one bit shift register having an input operatively connected to said output of said serial selector and has an output operatively connected to said network port output.

* * * * *